US011098822B2

(12) United States Patent
Götz et al.

(10) Patent No.: US 11,098,822 B2
(45) Date of Patent: Aug. 24, 2021

(54) ARRANGEMENT WITH ON/OFF VALVE, PNEUMATIC ACTUATOR, MAGNETIC VALVE AND FUNCTION MONITORING DEVICE

(71) Applicant: Siemens Aktiengesellschaft, Munich (DE)

(72) Inventors: Ewa Götz, Karlsruhe (DE); Johannes Barth, Karlsruhe (DE); Stefan von Dosky, Karlsruhe (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 16/986,865

(22) Filed: Aug. 6, 2020

(65) Prior Publication Data
US 2021/0041038 A1 Feb. 11, 2021

(30) Foreign Application Priority Data
Aug. 8, 2019 (EP) .................................... 19190824

(51) Int. Cl.
*F16K 37/00* (2006.01)
*F16K 31/42* (2006.01)
(Continued)

(52) U.S. Cl.
CPC ........ *F16K 37/0041* (2013.01); *F16K 31/124* (2013.01); *F16K 31/1221* (2013.01);
(Continued)

(58) Field of Classification Search
CPC .... F16K 31/42; F16K 31/406; F16K 31/1221; F16K 31/124; F16K 37/005;
(Continued)

(56) References Cited

U.S. PATENT DOCUMENTS 4,241,644 A * 12/1980 Schertler ............... F16K 31/406
91/447
9,869,981 B2 * 1/2018 Kemp ..................... G08C 19/02
(Continued)

FOREIGN PATENT DOCUMENTS

DE  102007016817  10/2008
DE  102007022762  11/2008
(Continued)

OTHER PUBLICATIONS

EP Search Report dated Mar. 10, 2020 based on EP19190824 filed Aug. 8, 2019.

*Primary Examiner* — Atif H Chaudry
(74) *Attorney, Agent, or Firm* — Cozen O'Connor

(57) ABSTRACT

An arrangement includes a field device with an on/off valve, a pneumatic actuator that moves the on/off valve, when applied with compressed air, into one on/off position and when ventilated into the other on/off position, a magnetic valve that applies compressed air to the actuator during electric actuation and ventilates the actuator during non-actuation and a function monitoring device that detects at least one parameter that refers to the movement of the on/off valve, where the function monitoring device includes a magnetic field sensor detecting changes to a magnetic field, where the magnetic field sensor is arranged in the region of the magnetic valve and generates a signal awakening the function monitoring device to detect the at least one parameter.

16 Claims, 3 Drawing Sheets

(51) Int. Cl.
*F16K 31/122* (2006.01)
*F16K 31/124* (2006.01)
*F16K 31/40* (2006.01)

(52) U.S. Cl.
CPC ............ *F16K 31/406* (2013.01); *F16K 31/42* (2013.01); *F16K 37/005* (2013.01); *F16K 37/0008* (2013.01); *F16K 37/0033* (2013.01); *F16K 37/0066* (2013.01); *F16K 37/0083* (2013.01); *F15B 2211/6316* (2013.01)

(58) Field of Classification Search
CPC ............ F16K 37/0041; F16K 37/0033; F16K 37/0083; F15B 19/00; F15B 5/006; F15B 2211/857; F15B 2211/862; F15B 2211/8636; F15B 2211/6316; F15B 2211/6336; F15B 2211/634; F15B 2211/7052; F15B 2211/327
See application file for complete search history.

(56) References Cited

U.S. PATENT DOCUMENTS

| | | | | |
|---|---|---|---|---|
| 10,317,718 | B2* | 6/2019 | Ihalainen | ............ G02F 1/13338 |
| 2008/0237516 | A1* | 10/2008 | Hansson | ............ F16K 37/0058 251/129.01 |
| 2010/0037966 | A1 | 2/2010 | Braun et al. | |
| 2010/0089473 | A1 | 4/2010 | Grein et al. | |
| 2010/0187456 | A1 | 7/2010 | Heer et al. | |
| 2010/0236632 | A1* | 9/2010 | Jakobsen | ................ F15B 21/06 137/1 |
| 2010/0282990 | A1 | 11/2010 | Heer | |
| 2010/0315069 | A1 | 12/2010 | Heer et al. | |
| 2011/0252895 | A1 | 10/2011 | Kiesbauer et al. | |
| 2012/0055329 | A1 | 3/2012 | Heer | |
| 2016/0332355 | A1* | 11/2016 | Rymann | ................ B29C 49/66 |
| 2018/0112796 | A1 | 4/2018 | Junk et al. | |
| 2018/0149286 | A1* | 5/2018 | Ihalainen | ................ G05D 7/06 |
| 2020/0011451 | A1 | 1/2020 | Junk | |

FOREIGN PATENT DOCUMENTS

| | | |
|---|---|---|
| DE | 102007020597 | 1/2009 |
| DE | 102007034059 | 1/2009 |
| DE | 102007034060 | 1/2009 |
| DE | 102009006533 | 9/2010 |
| EP | 2381149 | 10/2011 |
| WO | 2017112918 | 6/2017 |
| WO | 2018075241 | 4/2018 |

* cited by examiner

ARRANGEMENT WITH ON/OFF VALVE, PNEUMATIC ACTUATOR, MAGNETIC VALVE AND FUNCTION MONITORING DEVICE

BACKGROUND OF THE INVENTION

1. Field of the Invention

The invention relates to an arrangement comprising a field device having an on/off valve, a pneumatic actuator and a magnetic valve and a function monitoring device, where with electrical actuation the magnetic valve applies compressed air to the actuator and with non-actuation ventilates the actuator, where the actuator moves the on/off valve into one on/off position when applied with compressed air and into the other on/off position when ventilated, and where the function monitoring device is configured to detect at least one parameter that refers to the movement of the on/off valve.

2. Description of the Related Art

EP 2 381 149 B1 discloses an arrangement in which the function monitoring device is an integral part of the field device.

On/off valves or switching valves with two fixedly defined switching states (frequently: 100% opened and completely closed) are required in process industry to allow a medium to pass or to block the medium, and in many cases fulfill safety-relevant tasks. With the conventional arrangements, the on/off valve is either brought into an operating position, e.g., "on" or a safety position, e.g., "off" via a pneumatic actuator. A magnetic valve (pilot valve), which is actuated with a control voltage supplied by a control system, connects the actuator to a compressed air supply. If with a power failure or in the event of an emergency the control voltage is switched off, then the pneumatic actuator is ventilated by way of the magnetic valve so that the on/off valve is moved out of the operating position into the safety position. Depending on the design of the on/off valve, the actuator can be formed as a linear drive or rotary drive.

With the conventional field device described in the aforementioned publication EP 2 381 149 B1, the function monitoring device comprises a pressure sensor for detecting the variation in time of the pneumatic working pressure prevailing in the working chamber of the actuator or of the pneumatic control pressure output on the magnetic valve. Based on a detected pressure change in the variation in time and based on pressure change empirical values, a physical travel variable, such as the position, the travel time or the adjustment travel of the on/off valve, is determined. An error signal is generated if the actual pressure course or actual pressure change course deviates from a target pressure course or target pressure change course of the on/off valve operating without fault when a predetermined tolerance is exceeded.

The detection of the variation in time of the pneumatic pressure and particularly the function diagnosis of the on/off valve can then be initiated if a pressure change, i.e., a drop in pressure and/or an increase in pressure, is detected.

DE 10 2007 034 059 B4, DE 10 2007 034 060 B4, DE 10 2007 022 762 B4, DE 10 2009 006 533 B4, DE 10 2007 020 597 A1 or DE 10 2007 016 817 A1 each discloses field devices with on/off valves, pneumatic actuators, magnetic valves and function monitoring devices.

With these conventional arrangements, the function monitoring device is used to check the functional capability of the actuator within the scope of a partial stroke test.

To this end, an additional electropneumatic position controller can be attached to the actuator, for instance. With the partial stroke test, the on/off valve is moved via the position controller out of the operating position across one part of its adjustment travel in the direction of the safety position and is then moved back again. Here, the position change is so minimal that the ongoing operation of the system, into which the on/off valve is integrated, does not have to be interrupted and is only insignificantly disturbed. The position controller has a position sensor, in order to detect the actuation during the partial stroke test and then to store and/or evaluate the actuation. It is to be understood the actuation can also be detected and evaluated outside of the partial stroke test if, under normal operating conditions, within the scope of a full stroke test or in the event of an emergency, the on/off valve is closed. In this way, further parameters that refer to the movement of the actuator, such as the supply air pressure, can be detected and evaluated via the position controller. Providing a position controller only for the partial stroke test is, however, expensive both in terms of materials and also financially.

With the conventional arrangement described in DE 10 2007 034 059 B4, the function monitoring device manages without a position controller, but the function monitoring of the actuator is restricted to the partial stroke test.

Pneumatically driven field devices with on/off valves are in most cases neither equipped with a position controller, nor do they have a separate function monitoring device comparable to that from EP 2 381 149 B1. Such pneumatically driven field devices typically have long maintenance intervals and, apart from the optional end position switches, have no sensors for a function monitoring that extends beyond the partial stroke test. It is therefore not possible, for instance, to identify whether the on/off valve is completely closed, but only whether the actuator has reached the desired position. It therefore only involves indirect feedback. Statements about the closing ability of the on/off valve or the force or torque reserve of the actuator still available cannot be made in this way. Typical signs of aging, such as a drive shaft that is stiffer as a result of corrosion, a decreasing drive torque due to a spring fatigue or leakage in the drive and, e.g., caking in the on/off valve, cannot be identified.

For maintenance, the valves are therefore typically disassembled from the process system and examined in a workshop. Mobile measuring kits are also known, which can be used in conjunction with corresponding sensor systems for pressure and travel to record the switching process, i.e., the opening and closing of the pneumatically driven on/off valve.

SUMMARY OF THE INVENTION

In view of the foregoing, it is therefore an object of the present invention to provide a function monitoring device for a field device with a pneumatically driven on/off valve, which requires as little energy as possible and can subsequently be arranged on the field device, without having to be supplied with current herefrom.

This and other objects and advantages are achieved in accordance with the invention by an arrangement in which the function monitoring device has a magnetic field sensor that detects changes to a magnetic field, where the magnetic field sensor is arranged in the region of the magnetic valve and generates a signal that awakens the function monitoring device in order to detect the at least one parameter.

With the arrangement in accordance with the invention, the function monitoring is then activated or triggered if the magnetic valve is activated or deactivated, which is detected based on the change in the magnetic field. Magnetic field sensors are known in very different embodiments as electromechanical Reed contacts, induction coils or electronic magnetic switches with magnetoresistive or Hall elements, and they require no auxiliary energy for their function, such as in the case of Reed contacts or induction coils, or are characterized by a very small energy input in the case of electronic magnetic switches. In any case, the energy input is smaller than with the permanent monitoring of the pressure known from the EP 2 381 149 B1. The triggering by a rapid magnetic field switch is also advantageous because the feed air pressure (the holding pressure of the drive) is always initially measured. The pressure transient when switching the magnetic valve already contains information about the state of the magnetic valve. Only then and with a drop in pressure in the drive does the movement of the drive begin. The magnetic valve and then the drive can therefore be measured and monitored one after the other. Moreover, it is not imperative that the actuator has a pressure sensor. The function monitoring device can comprise a vibration sensor, which, in addition or alternatively to the pneumatic adjusting pressure, detects vibrations of the field device as the parameter which refers to the movement of the on/off valve. In this case, the function monitoring device is independent of the field device to be monitored, so that it can be formed as a separately powered device, which can be detachably assembled on the on/off valve or the pneumatic actuator. The self-supply can occur via battery or solar cell.

The function monitoring device can be formed as a data logger, in which the measured values of the parameter (e.g., set pressure and/or vibrations) detected for a predetermined time after triggering the function monitoring are stored. The stored measured values can be read out, if necessary, in particular transferred via a radio interface to a remote point for evaluation. The measurement data can be transmitted to a mobile communication terminal or via a gateway into a cloud and evaluated at this location. The evaluation can alternatively also occur in situ in the function monitoring device, where the results of the evaluation are then transmitted to a remote point.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below on the basis of exemplary embodiments and with reference to the figures of the drawing, in which, in detail.

DETAILED DESCRIPTION OF THE EXEMPLARY EMBODIMENTS

The same reference signs have the same meaning in the different figures. The representations are purely schematic and do not represent proportions.

Figure 1:
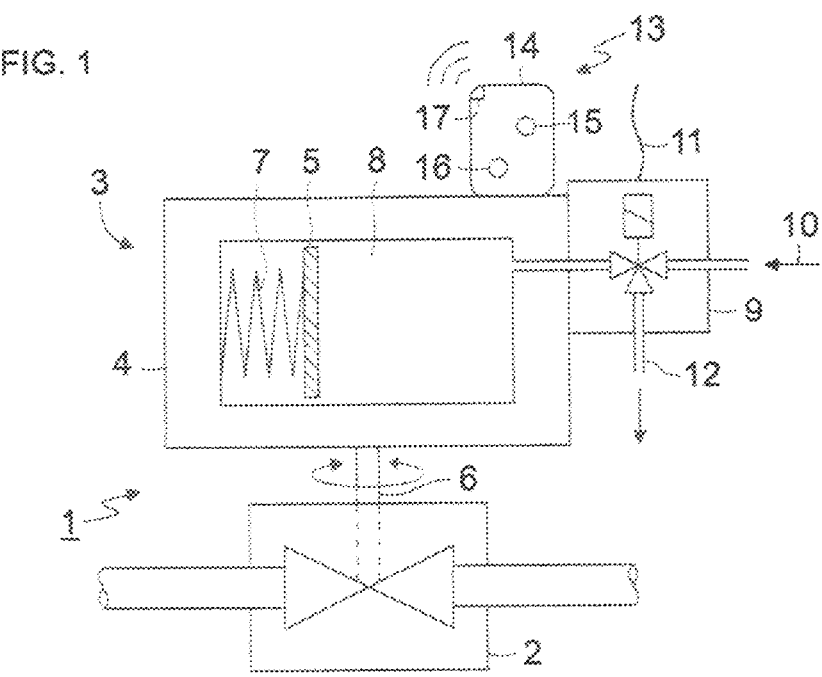
FIG. 1 shows a first exemplary embodiment of the inventive arrangement with on/off valve, pneumatic actuator, magnetic valve and function monitoring device.

FIG. 1 shows a field device 1 with an on/off valve 2, which can be brought into an on/off position via a pneumatic actuator 3. The pneumatic actuator 3 has a drive housing 4, in which a drive element 5, for instance, a piston or a membrane, is arranged moveably and acts on the on/off valve 2 via an adjusting element 6. Depending on the design of the on/off valve 2, the actuator 3 can be a linear or lift drive with a lifting rod forming the adjusting element 6 or, as shown here, a rotation or pivot drive with a rotating shaft as an adjusting element 6. The drive element 5 is loaded, on one side, by a compression spring 7 and, on the other side, by a pneumatic pressure in a pressure chamber 8 that acts counter to the compression spring 7. A magnetic valve 9 is attached to the drive housing 4, via which the pressure chamber 8 can either be supplied with compressed air 10 from a compressed air source (not shown here) or can be ventilated. Here, the magnetic valve 9 is formed as a three-way valve and obtains a supply voltage of, for instance, 24 V, via an actuation line 11. The supply voltage can be provided by a control device (not shown here) and in the normal case is switched on such that the magnetic valve 9 is activated and the pressure chamber 8 connects to the compressed air 10. On account of the compressed air applied to the drive element 5, the on/off valve 2 is brought into an operating position, e.g., "on", and is held in this position. In the event of an emergency, the control device switches off the supply voltage, such that the then deactivated magnetic valve 9 separates the pressure chamber 8 from the compressed air supply and instead ventilates the pressure chamber 8 via an outlet 12. The actuator 3 is thereupon pressureless and moves the on/off valve 2 into a safety position, e.g., "off", under the effect of the compression spring 7. The switching on and off of the supply voltage can also occur under normal operating conditions, in order to bring the on/off valve 2 into the one or other position.

A function monitoring device 13, which is realized here in the form of an independent device with a device housing 14, is assembled at a suitable point on the field device 1, e.g., on the drive housing 4 of the actuator 3, here. Assembly occurs via screws, clamps or a fastening magnet. The function monitoring device 13 comprises inter alia a magnetic field sensor 15, a vibration sensor (acceleration sensor, structure-borne sound sensor) 16 and a radio module 17. The magnetic field sensor 15 is used to detect changes to the magnetic field produced by the magnetic valve 9 and in this way to detect whether the magnetic valve 9 is deactivated on account of a disconnection or a failure of the supply voltage or is activated again by switching on the supply voltage. For monitoring the magnetic valve 9, the magnetic field sensor 15 requires no or only very minimal auxiliary energy. The movement of the on/off valve 2 that follows the deactivation or activation of the magnetic valve 9 is monitored based on vibrations of the field device 1, which are detected by the vibration sensor 16. The detection of the vibrations and their evaluation and/or storage in the function monitoring device 13 is restricted to a predetermined period of time, such as 5 seconds, after detecting the deactivation or activation of the magnetic valve 9 and is activated by a corresponding signal of the magnetic field sensor 15. The energy consumption of the function monitoring device 13 is therefore minimal and can be covered by a photocell or a battery, for instance. The detected vibrations can be stored as raw data directly in the function monitoring device 13 in order to read them out if necessary, via a suitable wired interface or the radio interface of the radio module 17 and to evaluate the detected vibrations externally. The detected vibrations can, however, also be evaluated in the function monitoring device 13 and then stored. The radio module 17 enables a wireless transmission of the stored data to an external point.

In the example shown in FIG. 1, the function monitoring device 13 is assembled on the drive housing 4 of the actuator 3 in the vicinity of the magnetic valve 9.

Figure 2:
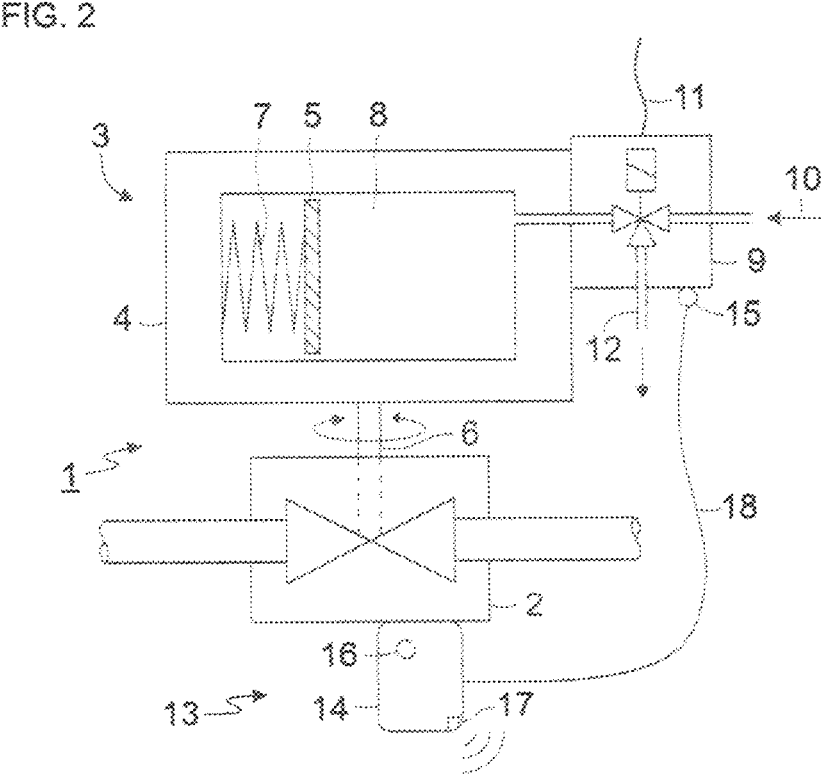
FIG. 2 shows a second exemplary embodiment of the arrangement according to the invention.

FIG. 2 shows a further example, in which the function monitoring device 13 is fastened to the on/off valve 2. Here, the magnetic field sensor 15 is arranged outside of the device housing 14 of the function monitoring device 13 on the magnetic valve 9 and is connected via a line 18 to the function monitoring device 13.

Figure 3:
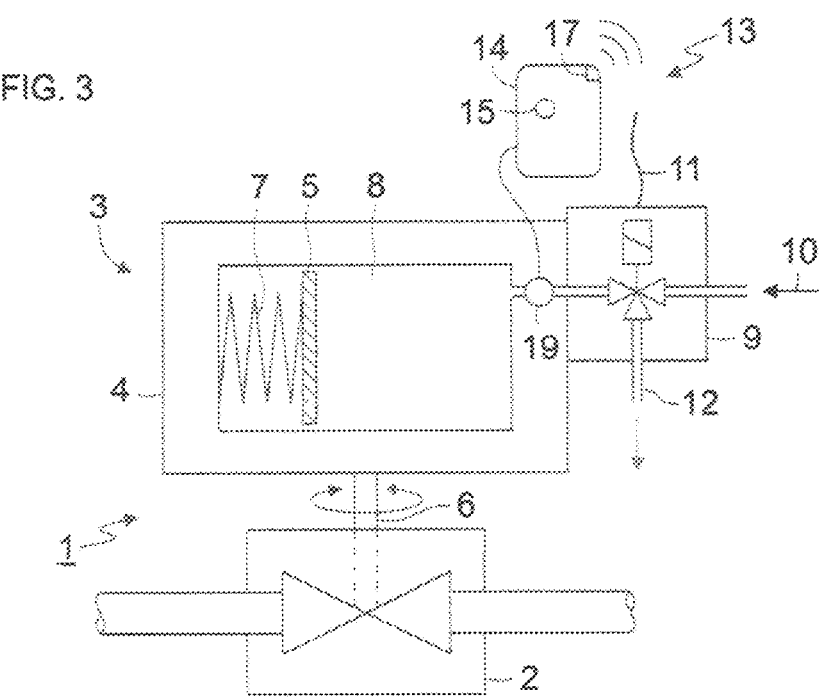
FIG. 3 shows a third exemplary embodiment of the arrangement in accordance with the invention.

FIG. 3 shows an exemplary embodiment of the inventive arrangement, in which a pressure sensor 19 is provided instead of the vibration sensor 16, in order to monitor the movement of the on/off valve 2 that follows on from the deactivation or activation of the magnetic valve 9. The pressure sensor 19 is an integral part of the actuator 3 and detects the pneumatic control pressure. The detection of the control pressure and its evaluation and/or storage in the function monitoring device 13 is activated by the signal of the magnetic field sensor 15.

Figure 4:
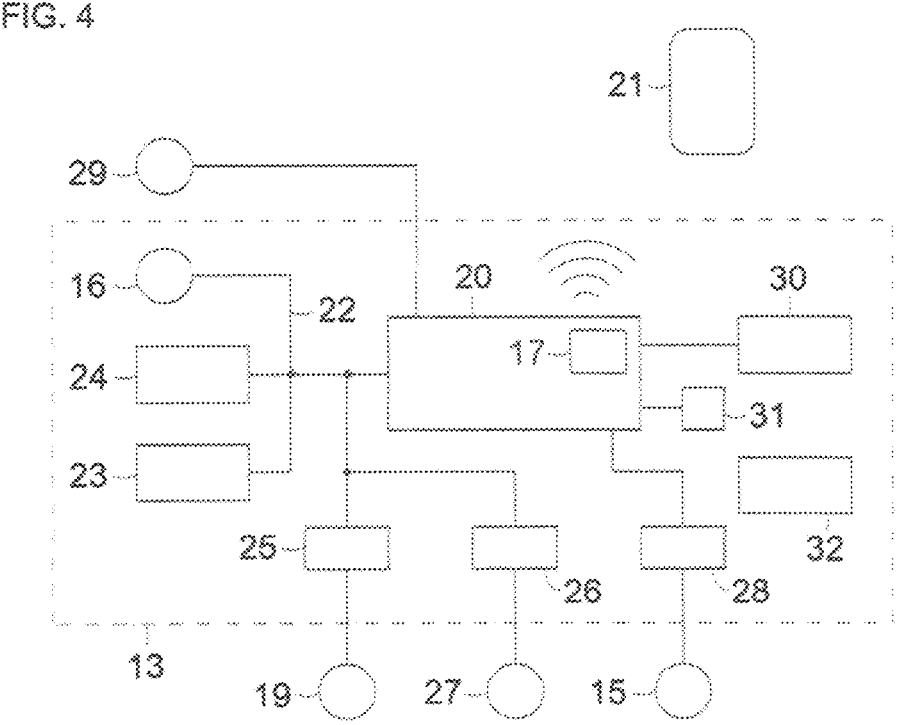
FIG. 4 shows an exemplary embodiment of the function monitoring device in accordance with the invention.

FIG. 4 shows an exemplary block diagram of the function monitoring device 13 in accordance with an embodiment of the invention. The function monitoring device 13 contains an energy-efficient microcontroller 20, in which in the illustrated example the radio module 18 configured here for short-range radio connections (e.g. Bluetooth, WPAN) can be integrated. A mobile communication terminal 21, such as a smartphone, tablet computer or laptop, is considered as a receiver for the data transmitted by the function monitoring device 13 or read out therefrom, e.g., in which the data can possibly be evaluated or with which this data can be forwarded to a remote point, e.g., a local server or a cloud server.

A RAM memory 23, a Flash memory 24, the vibration sensor 16, ports 25, 26 for external analog or digital sensors, such as the external pressure sensor 19 (FIG. 3) or, e.g., a magnetoresistive, position or rotation angle sensor 27 for detecting a lifting position or rotation angle position of the adjusting element 6 (FIG. 1-3) are on the microcontroller 20 via a bus system 22. The external magnetic field sensor 15 (FIG. 2) can be connected to a trigger input of the microcontroller 20 via a trigger port 28. Alternatively, the magnetic field sensor 15, as shown in FIG. 1 or 3, is arranged in the housing 14 of the function monitoring device 13 and is connected there directly to the trigger input of the microcontroller 20. The magnetic field sensor 15 is a magnetic switch, for instance. A Pulse Density Modulation (PDM) microphone 29 can also be connected to the microcontroller 20.

The function monitoring device 13 has an LED display 30, a real time clock 31 and an internal battery 32 for supplying current to the electric and electronic components of the function monitoring device 13. The power supply can alternatively occur via the supply voltage of the magnetic valve 9.

In order to ensure as high a battery service life as possible, the function monitoring device 13 is disposed for most of the time in a rest mode, in which almost no energy is consumed. During this time, the magnetic switch 15 is monitored and the real time clock 31 is operated in order to be able to assign a unique item of data to an upcoming event. Furthermore, a Bluetooth Low Energy Advertising is performed at regular time intervals, such as every 10 seconds. As soon as the magnetic valve 9 connects, the magnetic switch 15 triggers and moves the function monitoring device 13 out of the rest mode into a measuring mode. During a predetermined time interval, such as 5 seconds, data of the vibration sensor 16 is stored at a high data rate in the RAM memory 23. At the same time, data from the other sensors 19, 27, 29 (provided they are available) can also be recorded and stored with a lower data rate. If the actuator 3, as shown in FIG. 3, contains a pressure sensor 19, then it is possible to dispense with the recording of vibrations. The start of the data recording obtains a time stamp via the real time clock 31. After a measuring or recording cycle, the raw data is copied from the RAM memory 23 into the Flash memory 24. The function monitoring device 13 then moves back into the rest mode.

The data records comprising a number of measurements can be stored in the Flash memory 24, in order to be transmitted, e.g., if necessary or on request, via the radio interface of the radio module 17 to the mobile communication terminal 21 or via a gateway into a cloud. The raw data can then be evaluated or further processed there. Basically, however, the evaluation or further processing is also possible via the microcontroller 20 which is, however, associated with a higher energy consumption in the function monitoring device 13. The evaluation or further processing can consist, for instance, in the recorded measurement data curves being compared with standard curves, which have been recorded during the commissioning of the intact valve 2.

Figure 5:
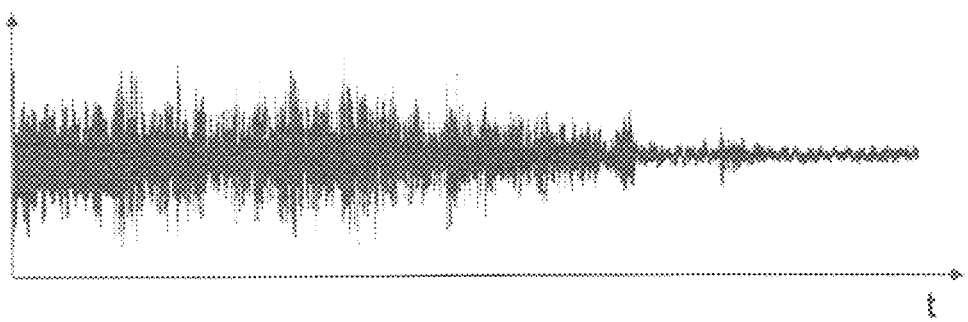
FIG. 5 shows an exemplary graphical plot of noisy vibration measurement data of a valve through which fluid flows.
Figure 6:
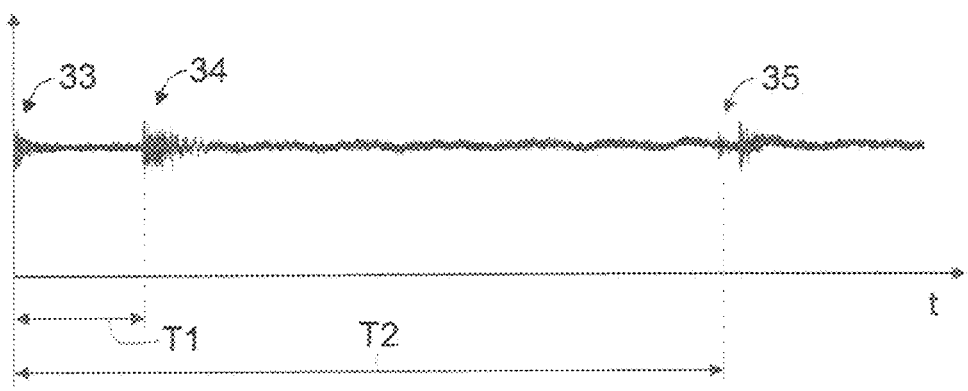
FIG. 6 shows an exemplary graphical plot of the vibration measurement data when the fluid is still.

FIG. 5 shows an exemplary graphical plot of the recorded vibration measurement data over time t, if a fluid is pumped through the valve 2, where the flow noise is reduced successively until the valve 2 is closed and no more medium is flowing. FIG. 6 shows a graphical plot of the vibration measurement data with a stationary fluid. In the case of the stationary fluid with less interfering noises and vibrations, three uniquely identifiable features 33, 34, 35 can be seen. The time T1 between the first 33 and second feature 34 represents the time elapsed between the start of pressure being applied to the actuator 3 and the moment from which the drive 3 begins to move, also known as breakaway torque. The third feature 35 indicates the moment at which the closing element of the valve 2 penetrates the valve seat. 2 or 3 characteristics are therefore obtained, with which statements about the state of the drive 3 or the process valve 2 can be made. If these times T1 and T2 change, the ability to block has disadvantageously also changed.

Figure 7:
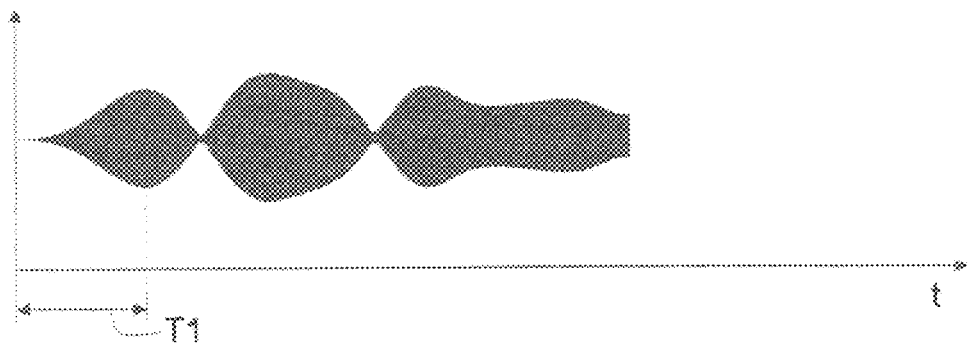
FIG. 7 shows an example of the noisy vibration measurement data after bandpass filtering in accordance with the invention.

With the noisy vibration measurement data shown in FIG. 5, the time T1 can be determined, for instance, because initially a characteristic frequency peak is firstly determined via Fast Fourier transformation in the vibration measurement data. The vibration measurement data is then band-pass-filtered about the determined frequency peak. FIG. 7 shows the thus filtered vibration measurement data in which the time T1 until the valve 2 breaks free can be detected. The time T2 can by contrast be readily determined from the unfiltered vibration measurement data, because at this point in time the valve is completely closed so that there is no throughflow with corresponding noise in the vibration measurement data.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement comprising:
a field device having an on/off valve;
a pneumatic actuator which moves the on/off valve, when applied with compressed air, into one on/off position and when ventilated into another on/off position;
a magnetic valve which applies the compressed air to the pneumatic actuator during electric actuation and ventilates the pneumatic actuator during non-actuation; and
a function monitoring device configured to detect at least one parameter which refers to the movement of the on/off valve;
wherein the function monitoring device includes a magnetic field sensor which detects changes to a magnetic field, said magnetic field sensor being arranged in a region of the magnetic valve and generating a signal awakening the function monitoring device to detect the at least one parameter.

2. The arrangement as claimed in claim 1, wherein the function monitoring device comprises a pressure sensor which detects pneumatic pressure in the actuator as the parameter which refers to the movement of the on/off valve.

3. The arrangement as claimed in claim 2, wherein the function monitoring device comprises a vibration sensor which detects vibrations of the field device as the parameter which refers to the movement of the on/off valve.

4. The arrangement as claimed in claim 2, wherein the function monitoring device includes an evaluator for evaluating measured values of the detected parameter and an interface for transmitting the result of the evaluation to a remote point.

5. The arrangement as claimed in claim 4, wherein the interface comprises a radio interface.

6. The arrangement as claimed in claim 1, wherein the function monitoring device comprises a vibration sensor which detects vibrations of the field device as the parameter which refers to the movement of the on/off valve.

7. The arrangement as claimed in claim 6, wherein the function monitoring device includes an evaluator for evaluating measured values of the detected parameter and an interface for transmitting the result of the evaluation to a remote point.

8. The arrangement as claimed in claim 7, wherein the interface comprises a radio interface.

9. The arrangement as claimed in claim 1, wherein the function monitoring device includes memory for storing measured values of the detected at least one parameter and an interface for transmitting the measured values to a remote point.

10. The arrangement as claimed in claim 9, wherein the interface comprises a radio interface.

11. The arrangement as claimed in claim 9, wherein the remote point is configured to evaluate the measured values of the detected at least one parameter.

12. The arrangement as claimed in claim 1, wherein the function monitoring device includes an evaluator for evaluating measured values of the detected parameter and an interface for transmitting the result of the evaluation to a remote point.

13. The arrangement as claimed in claim 12, wherein the interface comprises a radio interface.

14. The arrangement as claimed in claim 1, wherein the function monitoring device includes a power device for self-supply.

15. The arrangement as claimed in claim 14, wherein the power device for self-supply comprises a battery or solar cell.

16. The arrangement as claimed in claim 1, wherein the function monitoring device includes a housing for detachable assembly on one of (i) the on/off valve and (ii) the pneumatic actuator.

* * * * *